United States Patent
Underwood et al.

(10) Patent No.: US 8,671,453 B2
(45) Date of Patent: Mar. 11, 2014

(54) SOCIAL AGE VERIFICATION ENGINE

(75) Inventors: Edward Moore Underwood, Phoenix, AZ (US); Joseph E. Sullivan, Palo Alto, CA (US); Ryan McGeehan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 175 days.

(21) Appl. No.: 12/858,403

(22) Filed: Aug. 17, 2010

(65) Prior Publication Data
US 2012/0047560 A1 Feb. 23, 2012

(51) Int. Cl.
*G06F 7/04* (2006.01)

(52) U.S. Cl.
USPC .......... 726/26; 726/27; 726/28; 726/29; 726/30; 700/225; 700/227; 705/18; 713/187

(58) Field of Classification Search
USPC ............ 726/26–30; 700/225–227; 705/18; 713/187
See application file for complete search history.

(56) References Cited

U.S. PATENT DOCUMENTS

| | | | |
|---|---|---|---|
| 2008/0140569 A1* | 6/2008 | Handel | 705/44 |
| 2008/0189380 A1 | 8/2008 | Bosworth et al. | |
| 2009/0217342 A1* | 8/2009 | Nadler | 726/1 |
| 2009/0265764 A1* | 10/2009 | Schultz et al. | 726/4 |
| 2010/0211996 A1 | 8/2010 | McGeehan et al. | |
| 2010/0211997 A1 | 8/2010 | McGeehan et al. | |
| 2010/0229223 A1 | 9/2010 | Shepard et al. | |
| 2011/0314017 A1* | 12/2011 | Yariv et al. | 707/737 |

* cited by examiner

*Primary Examiner* — Christopher J Brown
*Assistant Examiner* — Roderick Tolentino
(74) *Attorney, Agent, or Firm* — Fenwick & West LLP

(57) ABSTRACT

A social networking system obtains parental authorization from a parent for a child to access a computing resource, where the parent and the child are users of the social networking system. The child user may request the authorization by identifying a purported parent user. The social networking system attempts to verify the validity of the purported parent user's account, the age of the user associated with the purported parent's account, and/or the existence of a parent-child relationship between users of the accounts associated with the purported parent and the child. The social networking system makes these determinations, at least in part, using social and transactional information associated with the purported parent user's account and the child user's account in the social networking system. Upon verification of these items, the social networking system may allow the purported parent to provide authorization responsive to the child's request to access the computing resource.

32 Claims, 5 Drawing Sheets

SOCIAL AGE VERIFICATION ENGINE

BACKGROUND

This invention relates generally to methods for obtaining parental consent for a child to access a computing resource, and in particular, methods for verifying a parent-child relationship and obtaining parental authorization by a social networking system.

Under certain government regulations, such as the Children's Online Privacy Protection Act (COPPA), operators of websites or online services that are directed towards children or that may otherwise collect personal information from children are required to obtain parental consent for the collection, use, or disclosure of the children's personal information. Parental consent is also appropriate when children request access to websites or online services that contain mature content or are primarily directed to adults.

Conventionally, parental authorization can be obtained through methods such as requiring credit card information, contacting the parent directly (i.e., via mail or fax), or obtaining a parent's signature on a consent form. These methods may be ineffective and burdensome on a larger scale, especially when hundreds of children request access to a website each day.

Additionally, methods for obtaining parental consent can be subject to fraud and inaccuracies. For instance, a child may take his parent's credit card and use it to gain access to a website without the parent's consent. An operator of the website lacks sufficient information to authenticate that the person giving consent is the parent of the child. Accordingly, there is a need for methods to obtain verifiable parental consent for a child's access to online websites and services.

SUMMARY

Embodiments of the invention provide methods for a social networking system to obtain parental consent for children to access a computing resource, such as an online environment. For example, a child may request access to the social networking system, another website, an online service, a game or other online application, a media item, or any other computing resource that requires parental authorization. Since the social networking system maintains a large amount of social and transactional information related to its users, this information can be leveraged to verify that one of its users is actually a parent of the child user who requested access. If the social networking system determines that one user is a parent of another, without an allowable level of confidence, the social networking system can obtain parental authorization from the parent without requiring the more tedious options for obtaining parental authorization discussed above.

In some embodiments, the child identifies a purported parent user. The social networking system verifies the validity of the purported parent user's account, the age of the user associated with the purported parent's account, and/or the existence of a parent-child relationship between users of the accounts associated with the purported parent and the child. The social networking system verifies these items using social information associated with the purported parent user's account and/or the child user's account in the social networking system. The social networking system requests that the verified parent user provide authorization of the child user's account in the social networking system.

For a verified parent-child relationship, the method can be used to obtain parental authorization for a child user's access to the social networking system itself, or to various third party websites, systems, or online services that are external to the social networking system. When a child requests access to a third party website, for example, the third party website can forward the request to the social networking system. The social networking system attempts to verify the purported parent-child relationship and, if so, requests that the parent user authorize the child user's access to the third party website. The parent user's response is communicated to the third party website to authorize or deny the child user's access. The third party website can also request pre-approval of a child user's access from the parent user (i.e., before the child requests access to the resource). In this way, the social networking system can act as a clearinghouse for parental authorization for any number of external systems.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments of the present invention provide systems, methods, and computer readable storage media for obtaining parental consent for a child's access to a computing resource. A computing resource can include a social networking system, a website external from the social networking system, an online service, a game or other online application, a media item, or any other computing environment that requires parental authorization. The computing resource can be a portion of a website, an online application that is run on a website, or media items shown on a website.

In some embodiments, the computing resource is a social networking system, such as a social networking website. A social networking system provides users a way to connect and communicate with other users. Social networking systems allow users to establish relationships or connections with others and share information in a variety of useful ways.

A user is a person who interacts with other persons or organizations via the social networking system and has an approved account in the social networking system. In some embodiments, the user is a parent ("parent user"). In other embodiments, the user is a child ("child user"), who must receive approval from a parent user in order to join the social networking system. A child is a person whose age requires parental consent in order to gain access to a computing resource. For example, children in the U.S. who are under 13 years old must obtain verifiable parental consent before accessing websites or online services that are directed to children or that collect information from children. In other embodiments, a child is a person who is a minor (under 18 years old). When a child requests access to the social networking system, the child may initially receive limited access and/or a limited account, until the child receives parental authorization to become an approved user of the social networking system.

System Architecture

Figure 1:
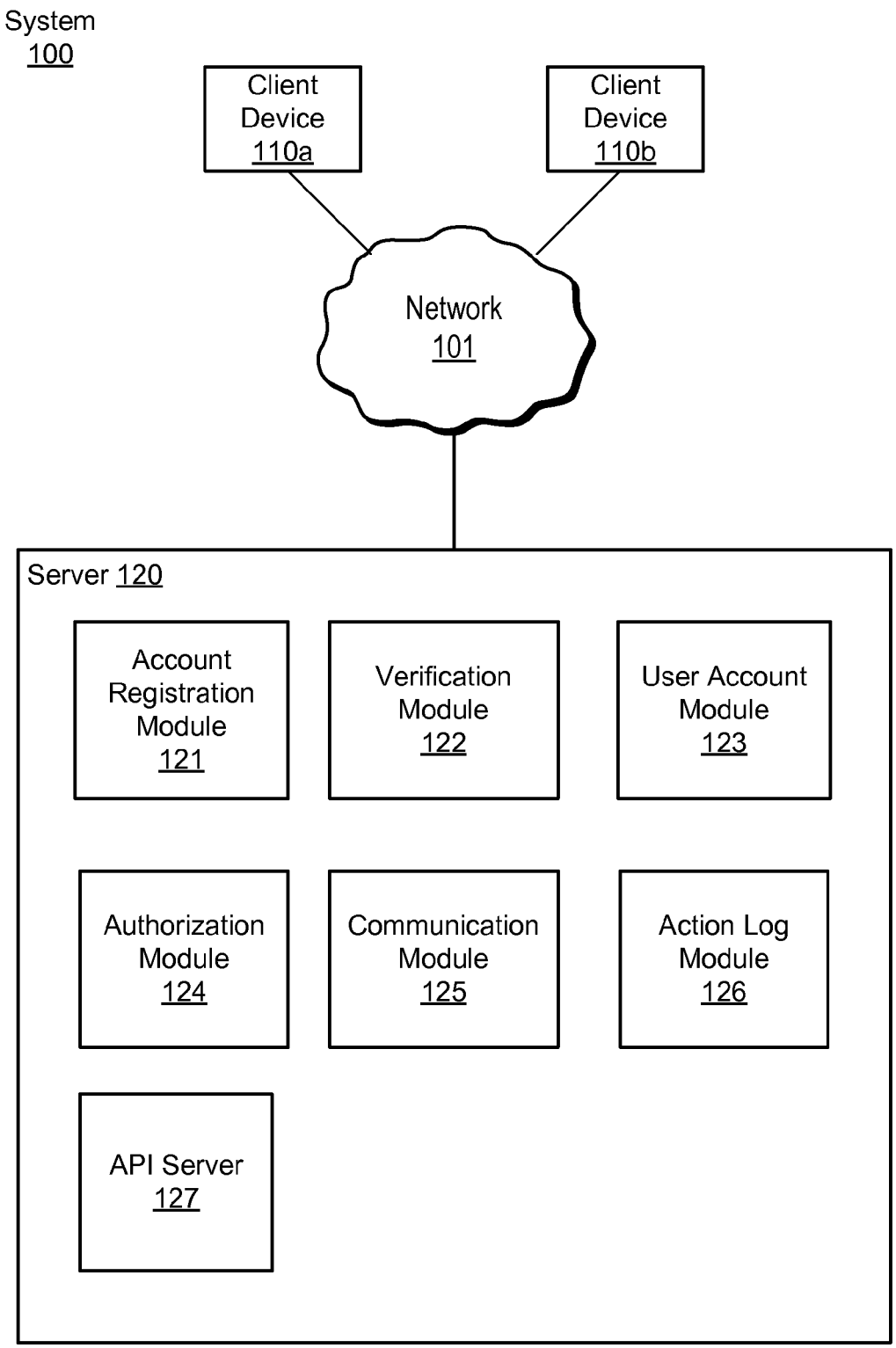
FIG. 1 is a high-level block diagram of a system environment, in accordance with an embodiment of the invention.

FIG. 1 is an illustration of a system environment 100 in accordance with one embodiment of the invention. The system environment 100 includes client devices 110a and 110b, a network 101, and a server 120.

The system environment 100 includes one or more client devices 110a and 110b. The client devices 110a and 110b can be desktop computers, laptop computers, portable computers, personal digital assistants (PDAs), smart phones, or any other device including computing functionality and data communication capabilities. A plurality of client devices 110a and 110b can be configured to communicate via the network 101.

The network 101 represents the communication pathway between the server 120 and the client device 110a and 110b. In one embodiment, the network 101 is the Internet and uses standard communications technologies and/or protocols. The network 101 can also utilize dedicated, custom, or private communications links that are not necessarily part of the Internet. The network 101 may comprise any combination of local area and/or wide area networks, using both wired and wireless communication systems.

The server 120 includes an account registration module 121, a verification module 122, a user account module 123, an authorization module 124, a communication module 125, an action log module 126, and an API server 127.

The account registration module 121 receives requests to create accounts from people who want to become users of the computing resource. In some embodiments, the person requesting an account is a child. The child provides identifying information of a user, who is the parent ("purported parent") of the child. The account registration module 121 sends the identifying information about the purported parent to the verification module 122 for verification of the purported parent's account. The account registration module 121 creates accounts for children who have received authorization from their verified parents. The detailed process for verification of an account is described herein in FIGS. 3-4.

Figure 2:
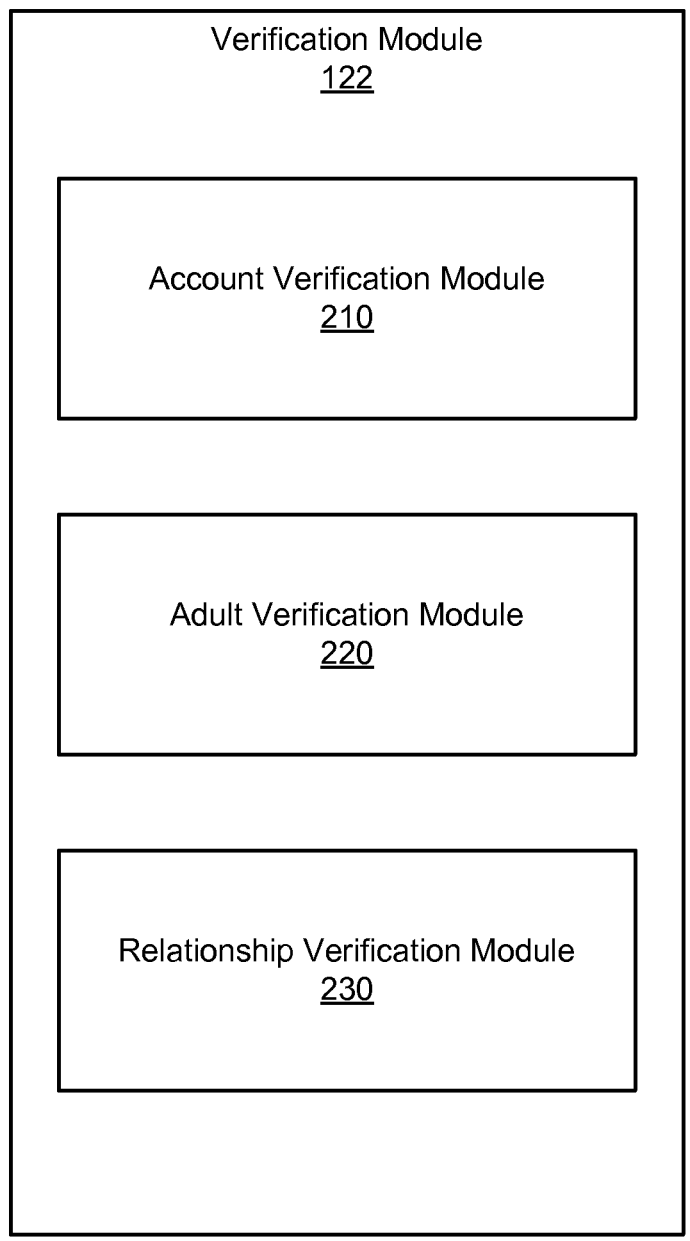
FIG. 2 is a high-level block diagram of the verification modules, in accordance with an embodiment of the invention.

The verification module 122 verifies the accounts of users, including the accounts of purported parents. As shown in FIG. 2, the verification module 122 includes an account verification module 210, an adult verification module 220, and a relationship verification module 230.

The account verification module 210 verifies that a purported parent has a valid account. The account verification module 210 analyzes the purported parent's account for suspicious activities or locations that would indicate that the account is not valid.

The adult verification module 220 determines the age of the purported parent and verifies that he or she is an adult. The declared age of the purported parent, average age of the purported parent's friends, or other social data associated with the account can be used to determine whether the purported parent is an adult.

The relationship verification module 230 determines whether the purported parent user is the parent of a child user. The parent-child relationship can be verified by forcing a declared relationship or analyzing other social data associated with one or both accounts.

Referring back to FIG. 1, the user account module 123 stores account data associated with a user's account. The account data includes identifying information about the user, such as the user's name, age, address, user identification (ID), and password. The user account module 123 stores account data for a plurality of users' accounts.

The authorization module 124 authorizes or denies user accounts. The authorization module 124 requests authorization from a parent user to allow the child user to open an account. When the parent user approves the child user's account, the authorization module 124 sends the authorization to the account registration module 121 to create the account in the system. In other embodiments, the authorization module 124 denies authorization of the child user's account based on the denial of the parent user.

The communication module 125 enables communication between the various modules and the network. The communication module 125 enables connectivity within the system environment.

When a user takes an action in the social networking system, the action is recorded by the action log module 126. The action log module 126 maintains a database of entries and stores data about actions (i.e., activities, communications, and interactions) for a plurality of users within the system. The action log module 126 stores data about past and current sessions associated with a user's account, including data about the user's activities and location of use for each session. Data can also include the time of the action, the user who performed the action, the target of the action, the type of action, the object that was acted on, and/or the content associated with the action. The frequency of a user's actions and/or affinity for certain activities or interactions can be stored by the action log module 126.

The API server 127 allows external websites to access information from the server 120. The API server 127 may allow external systems to send information to the server 120 by calling APIs. An external system sends an API request to the API server 127 via the network 101. The API server 127 processes the request by calling the appropriate program code to collect any appropriate response, which is then communicated back to the external system via the network 101. A request for parental authorization for a child's use of an external website can be sent to the to the API server 127.

Verification Method

Figure 3:
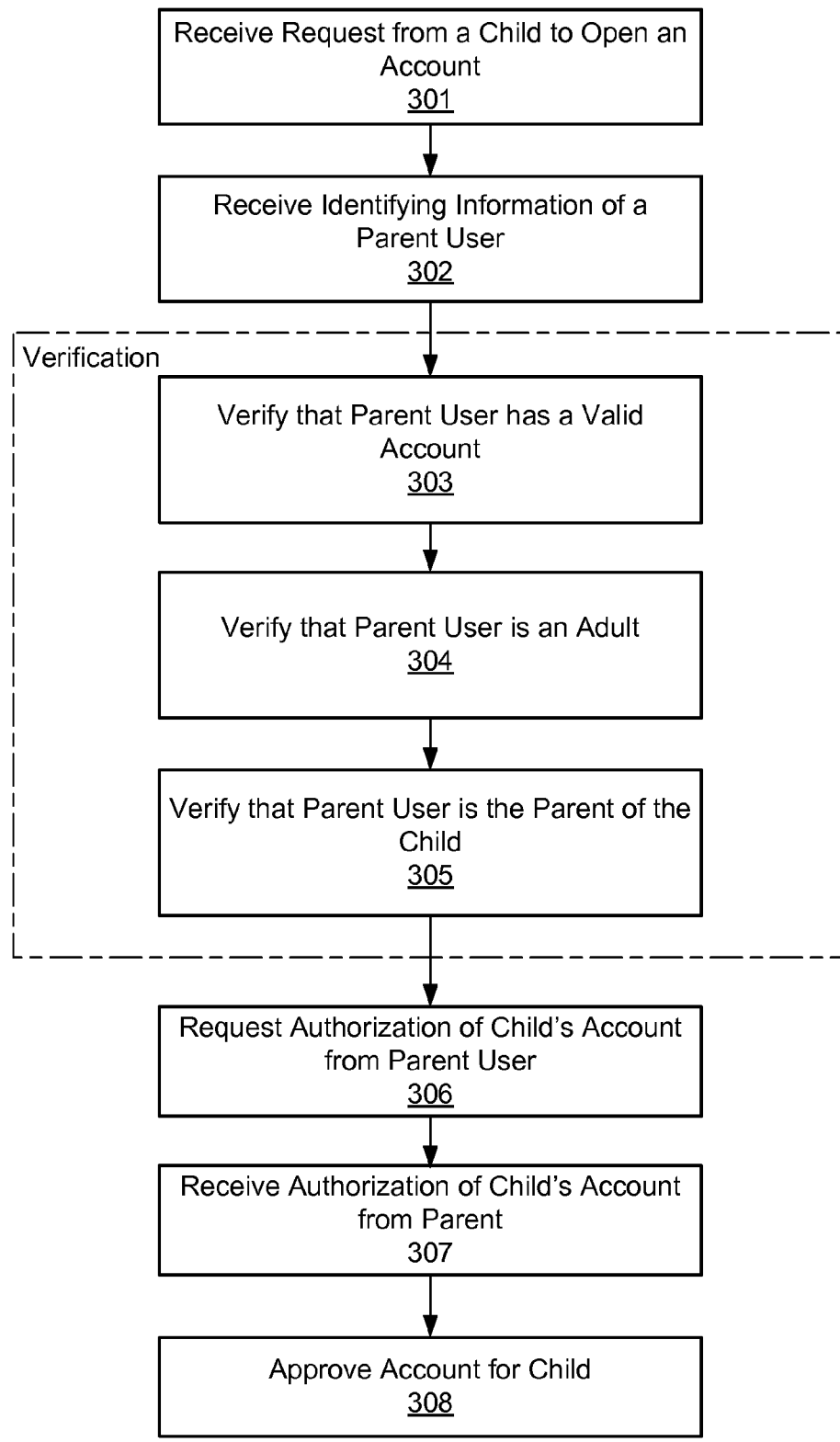
FIG. 3 is a flowchart of the parental authorization process, in accordance with an embodiment of the invention.

FIG. 3 illustrates steps for obtaining parental consent for a child user's account in a computing resource, according to one embodiment of the invention. In some embodiments, the account registration module 121 receives 301 a request from a child to open an account in the computing resource (for example, a social networking system). The account registration module 121 receives 302 identifying information of a parent user, who is the purported parent of the child. The identifying information can include the following: name, address, contact information (telephone number, email address), user identification (ID), or screen name of the purported parent.

The verification module 122 processes the steps to 1) verify 303 that the parent user has a valid account, 2) verify 304 that the parent user is an adult, and 3) verify 305 that the parent user is the parent of the child. In some embodiments, the verification steps 303, 304, and 305 are performed by the account verification module 210, the adult verification module 220, and the relationship verification module 230, respectively. The verification process can include any or all of the verification steps 303, 304, and 305 or other additional verification steps, in any order or combination.

Account Verification

The account verification module 210 verifies 303 whether a parent user has a valid account. A valid account is an account that is owned and accessed by a real person who is authorized to use the account. A valid account is associated with legitimate and safe activities in the system.

On the other hand, an account is not valid if it does not exist in the system (i.e., the name of the purported parent is not registered with an account). An account may also be invalid if it has been fraudulently accessed or used by someone other than the authorized user. For example, an account may be invalid if confidential information has been accessed from the user's account, such as the user ID, password, or account numbers. An account is also invalid if the account has been used to engage in suspicious activities or if the account has been accessed from a suspicious location, which is discussed in detail herein. In some embodiments, an account is invalid because it was created for an illegitimate use in the social networking system. For instance, if a user creates multiple accounts for the purpose of engaging in an online game in the social networking system, these accounts were created for an illegitimate use and would be invalid.

Figure 4:
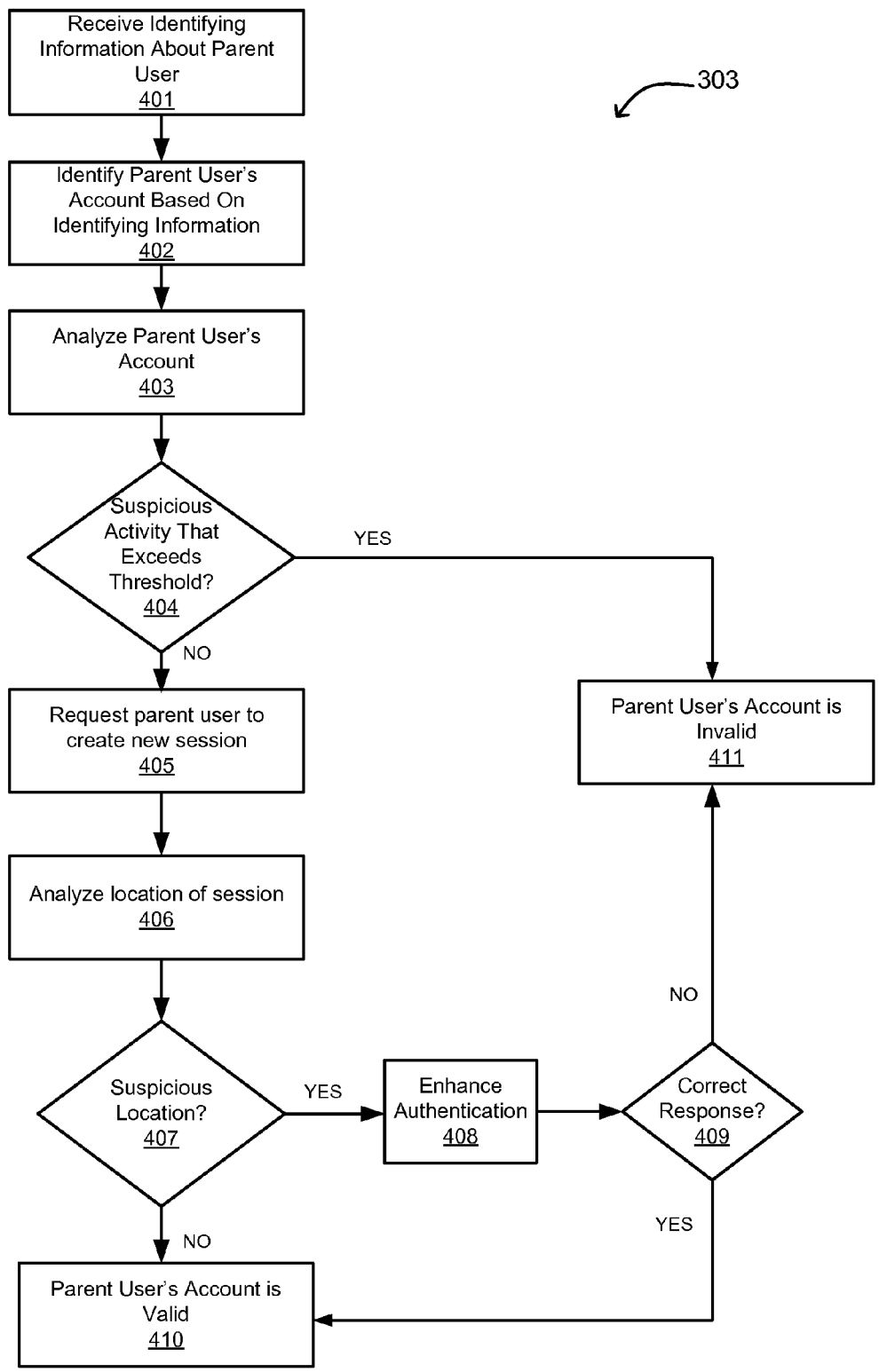
FIG. 4 is a flowchart of the account verification process, in accordance with an embodiment of the invention.

FIG. 4 shows the detailed process of verifying 303 whether a parent user has a valid account, according to one embodiment of the invention. The account verification module 210 receives 401 identifying information about the parent user who is the purported parent of the child user and identifies 402 the parent user's account based on the information. In some embodiments, the account verification module 210 determines that a parent user's account does not exist or has been abandoned. In some embodiments, the child user's request for access is denied if the identifying information does not match any user accounts in the system.

In some embodiments, the information associated with the parent user's account is analyzed 403 to determine whether it is owned by a legitimate user. For example, the activities associated with the parent user's account are analyzed. The action log module 126 provides data about the activities and interactions associated with a parent user's account. A valid account is likely to engage in safe or quality activities that enhance communication and social connections in the network. Safe or quality activities or interactions in the social networking system include, but are not limited to, the following: establishing connections with other users; sending messages to other users; posting stories, pictures, or links on profiles; participating in online discussions; commenting on other user's posts; and joining groups, events, or communities. A parent user's account that is connected with a large number of other users or that has engaged in numerous quality interactions in the social networking system is likely to be a valid account. Moreover, a parent user's account that has received communications or requests for connections from other users is likely to be a valid account because a legitimate user would receive communications or requests to form relationships from others. In contrast, an account may not be owned by a legitimate user if it has engaged in very few interactions or not received any communications from other users in the social networking system.

In another embodiment, the length of time that the account has been established can be a factor for determining whether an account is valid. For example, an account that has been in active use for several years can indicate that the account is valid.

In other embodiments, the authenticity of other user accounts that are connected to the parent user is analyzed. Other user accounts that are connected with the parent user's account may lack multiple connections with other users or have low quality interactions in the social networking system. This could indicate that the user accounts are invalid, and accordingly, the parent user's account may be invalid. On the other hand, if the user accounts associated with the parent user also have multiple connections, and the activities associated with those accounts are safe or of good quality, the parent user's account is likely to be valid. The accounts of multiple users associated with the parent user can be tracked and analyzed to determine whether those accounts are valid, in order to detect whether a group of fake accounts are connected to each other.

In one embodiment, the parent user's account is analyzed for suspicious activities. Suspicious activities can occur when an entity other than an authorized user creates a session by obtaining fraudulent access to the account (i.e., obtaining the user ID and password of an account and logging into the account pretending to be the authorized user). In some embodiments, suspicious activities include spamming (i.e., sending unsolicited advertisements, messages or requests to other users), phishing (i.e., attempting to obtain confidential information from other users), accessing sensitive information (i.e., social security numbers or credit card numbers), or any other type of illegitimate or objectionable actions that negatively affect other users of the social networking system.

If suspicious activities are associated with the user's account, the account verification module 210 determines whether the suspicious activities exceed 404 a predetermined threshold. For example, a predetermined threshold may be set in which a user's account is considered to be invalid if it is used to send more than one spam message to other users. In some embodiments, the user's account is invalid 411 if the suspicious activities exceed the threshold. Systems and methods for managing objectionable behavior in a web-based social networking system are disclosed in U.S. application Ser. No. 11/701,744, filed on Feb. 2, 2007, which is incorporated by reference in its entirety.

In some embodiments, if the suspicious activity associated with the user's account does not exceed the threshold, further verification steps can be performed. The system can request 405 that the parent user create a new session. A session is created when a user accesses the account by logging into the website or accessing a webpage from the website. Requesting that the parent user create a new session 405 allows the account verification module 210 to analyze 406 the location of the session and determine whether the user is accessing the account from a suspicious location. The location of the session is received from a computing device and can include the geographical location of the computing device, attributes about the physical attributes of the device used by the user, or the network address associated with the session created by the user.

A typical user is likely to create a session from the same set of locations on a regular basis, such as from a home computer or a work computer. For example, a user may routinely access his account from his home in Palo Alto, Calif. or his place of work in Mountain View, Calif. These locations are referred to as safe locations. A user is less likely to connect from a computer that is very far from the usual locations associated with the user. Accordingly, a session created from a distant location can be considered suspicious or unsafe. For instance, a session from Mexico City, Mexico would be an atypical user location for the user and would be considered a suspicious location.

Certain geographic locations, user locations, or netblocks originating sessions can be associated with a reputation based on a past history of suspicious sessions created from those locations. An attempt to create a session from a location with a history of suspicious sessions can be flagged as suspicious. For example, a user location in Nigeria may have a reputation for phishing and other fraudulent online activities. If a user's account that is typically associated with locations in the U.S.

creates a new session from Nigeria, this can indicate that the account has been compromised and is an invalid account.

Accordingly, the account verification module 210 receives the location information from the newly created session and determines 407 whether the session is from a suspicious location. In some embodiments, the account verification module 210 can determine whether the location matches one of the safe locations, and optionally, whether the location matches one of the known suspicious locations. In some embodiments, the account verification module 210 determines that the location of the new session matches a suspicious location, and the account is deemed to be invalid. In other embodiments, a threshold of sessions from suspicious locations must be met before the account is considered to be invalid. Systems and methods for authenticating user sessions based on reputation of user locations is disclosed in U.S. patent application Ser. No. 12/646,800, filed on Dec. 23, 2009, and U.S. patent application Ser. No. 12/646,803, filed on Dec. 23, 2009, each of which is incorporated by reference in its entirety.

In some embodiments, if the user creates a new session from a suspicious location, a form of enhanced authentication 408 is presented to the user. In one embodiment, a challenge-response test is presented to the user. A challenge-response test provides a challenge to the user, which requires a response that only the authorized user of the account would likely be able to answer. For example, a challenge may be presented as a security question based on information that only the user is likely to know. One type of challenge is a "Completely Automated Turing Test To Tell Computers and Humans Apart" (CAPTCHA), which requires a user to read distorted text and type the letters or numbers to authenticate that the user is not an automated system or computer that has improperly gained access to the user's account.

A social CAPTCHA is another type of challenge that can be presented to a user of a social networking system that asks the user to identify information about the user's connections or interactions in the social networking system. For example, a user may be asked which one of five people are connected with the user in the social networking system. The difficulty level of the social CAPTCHA may be adjusted based on a degree of suspicion associated with the account, such as increasing the level of difficulty of the challenge, increasing the number of questions presented, or increasing the number of potential answers from which to choose. Systems and methods for using social information for authenticating a user session are disclosed in U.S. application Ser. No. 12/399,723, filed on Mar. 6, 2009, which is incorporated by reference in its entirety.

In related embodiments, the social CAPTCHA can be presented to the user at any time when suspicious activity is associated with the user's account in order to validate the account. For instance, a social CAPTCHA can be presented to the user when suspicious activities are identified from past sessions associated with the account. The social CAPTCHA can be presented after requesting 405 that the user create a new session or via email, text message, multimedia messaging service (MMS), or other type of online communication.

In one embodiment, the account verification module 210 determines 409 whether a correct response is received from the parent user. An incorrect response to the challenge results in a determination that the account is invalid 411. In some embodiments, the number of incorrect responses must exceed a threshold, in order for the account to be considered invalid 411. On the other hand, if the user provides a correct response, the user's account is valid 410.

In a related embodiment, a parent user's account can be analyzed for suspicious activities associated with the account that occur on third-party websites. For instance, a parent user's account in a social networking system can be used to log-in and connect to third party websites, such as an online retail website or an online banking service. The parent user's actions during a session on the third party website can be analyzed for suspicious activities. For example, a parent user's account may be used to log into a third party online classifieds website and post fraudulent sales items on the website. This can indicate that the parent user's account has been compromised and may be invalid. The account verification module 210 can receive data about the parent user's suspicious activities on the third-party website and analyze this information, using the methods described above, to determine whether the parent user's account is valid.

In another embodiment, a confidence score or metric is calculated for the validity of the parent user's account based on a variety of data associated with the account, using the methods described above. If the confidence score exceeds a threshold, the parent user's account is validated. If the confidence score does not exceed a threshold, the parent user's account is not valid. In other embodiments, a social CAPTCHA (or other challenge) is presented to the parent user to enhance authentication if the confidence score does not meet the threshold.

Adult Verification

Referring back to FIG. 3, if the parent user's account is determined to be valid, then the process continues by verifying 304 that the parent user is an adult. In some embodiments, the adult verification module 220 determines the age of the parent user based on social data associated with the account of the parent user.

In some embodiments, the age of the parent user can be determined directly from his or her account because the parent user has reported his or her age or birthday when registering for the account or subsequently added such information to the account. In other embodiments, the parent user can be asked directly to report his or her age.

The adult verification module 220 can also determine the age of the parent user based on analysis of the social data associated with the account. The social data associated with the account can be analyzed using a histogram, and various calculations can be made from the histogram analysis, including the average, median, skew, and kurtosis of the social data set. For example, the average age of the users connected to the purported parent user's account can be determined using as a histogram. If the average age of the users is 40 years old, the adult verification module 220 can determine that the parent user is an adult.

In some embodiments, the activities associated with the parent user's account are analyzed to determine the age of the parent user. For example, the parent user's activities may provide an indication of his or her approximate age, such as joining a university's alumni organization webpage or posting comments or links related to news articles or political stories with adult-oriented topics, including profile information showing an employment history or joining an employment-based network. If the majority of activities associated with the parent user's account are adult-oriented, the parent user is likely to be an adult.

Various other social data can indicate whether the parent user is an adult, such as data that indicates that the parent user has a job or is married. The adult verification module 220 can assess each of the social data as factors, either alone or in combination, to determine whether the parent user is an adult. In some embodiments, each factor is given a confidence score, and if the overall confidence score exceeds a predetermined threshold, the parent user is verified to be an adult.

In some embodiments, a machine learning algorithm can determine whether the parent user is an adult. Various social data are input as signals and analyzed by the machine learning algorithm. The signals can include the average, median, skew, and kurtosis from a histogram of the social data set. Signals may also include a binary input about the social data, such as whether the parent user has a job or is married. A machine learning algorithm can be trained on a set of signals associated with social data from a parent user who has been verified to be an adult. The machine learning algorithm can be adjusted using various rules and coefficients to accurately predict whether a parent user is an adult. Once the machine learning algorithm has been trained on a known data set, the algorithm can be used for determining whether other unverified parent users are adults. For example, the machine learning algorithm can receive as an input various signals about the average age of users connected with the parent user, the median age of the connected users, whether the parent user has engaged in adult-associated activities in the social networking system, and whether the parent user is married. The machine learning algorithm analyzes the signals and outputs a determination of whether the parent user is an adult.

Relationship Verification

The relationship verification module 230 verifies 305 that the parent user is a parent of the child. In one embodiment, the relationship verification module 230 can request that the parent user confirm that he or she is the parent of the child. The relationship verification module 230 can also request that the parent user declare a parent-child relationship on his or her profile.

The relationship verification module 230 can also determine whether the parent user is the parent by comparing social data about the parent user with the data submitted by the child user. For example, the relationship verification module 230 can determine that the parent user and the child user have the same last names, live in the same city, have the same address, or have declared relationships with the same family members.

In other embodiments, the actions of the parent user are analyzed to determine the existence of a parent-child relationship. A parent user may share pictures of his children on his profile, post stories on his profile about his children, send messages to other users about his children, or post events related to his children (for example, birthday parties or school-related activities) in the social networking system. In some embodiments, the pictures, stories, or events can be analyzed to verify the parent-child relationship.

In another embodiment, the parent user may have verified a parent-child relationship with some of his or her other children in the social networking system. If the other child users have the same last names or related identifying information as the requesting child user, this can indicate that the parent user is also the parent of the child user.

In a related embodiment, the user locations of the parent user and child user can be compared. In some embodiments, a parent-child relationship can be inferred based on similar user locations, such as the same network address from a home computer.

In some embodiments, the friends of the parent user in the social networking system can be asked to verify the existence of the parent-child relationship. In other embodiments, the parent user can be asked questions about the child user's data to verify the existence of the parent-child relationship.

Various other factors, including those described above, can be analyzed independently or in combination to verify the existence of the parent-child relationship. In some embodiments, each factor is given a confidence score, and if the overall confidence score exceeds a predetermined threshold, the parent-child relationship is verified.

In some embodiments, a machine learning algorithm can be used to verify the existence of a parent-child relationship. Various social data are input as signals and analyzed by the machine learning algorithm, including the activities of the purported parent in the social networking system. Some of the signals are input as binary data, indicating whether or not the purported parent user and the child user have the same last names, same addresses, or same user locations. A machine learning algorithm can be trained on a set of signals associated with a parent user and child user who already have a verified parent-child relationship. The machine learning algorithm can be adjusted to accurately predict whether there is a parent-child relationship. Once the machine learning algorithm has been trained on a known data set, the algorithm can be used for verifying other parent-child relationships.

Referring to FIG. 3, once the parent user's account has been verified and a parent-child relationship is confirmed, the verification module 122 can request 306 authorization of the child user's account from the parent user. This authorization request can be sent through the social networking system or via an email, text message, MMS, instant message, or other online communication. When the authorization of the child user's account is received 307, the account is approved 308 for the child user, and the child user can gain full access to the social networking system. If the parent user denies authorization to the child user, the child user's account is subsequently denied.

Application of Verification Methods

The systems and methods described above can be applied to obtain parental consent for a child user in various online contexts. For example, the systems and methods of verification described above can be applied to obtain parental authorization of a child user's access to a third party system, which includes third party websites, online services, a game or other online application, a media item, a portion of a third party website, an online application that is run on a third party website, or media items shown on a third party website. In some embodiments, the social networking system can allow the parent to engage in ongoing monitoring of the child's use of the social networking system and/or other third party websites or services.

Figure 5:
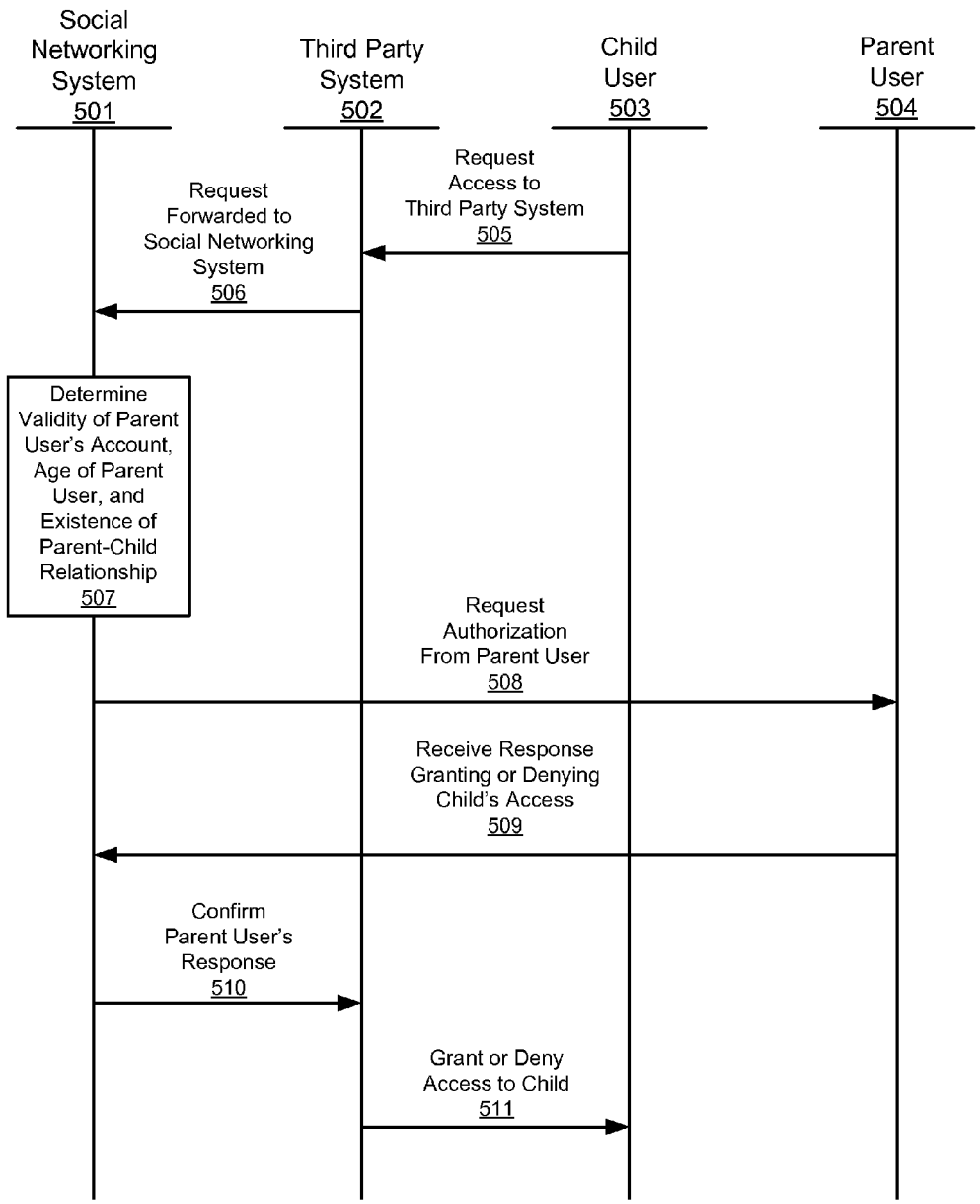
FIG. 5 is a trace diagram of the parental authorization process for third party systems, in accordance with an embodiment of the invention.

FIG. 5 shows a trace diagram of the verification process for a child user's 503 request to access a third party system 502. For instance, a child user 503 may request 505 access to a third party system 502, such as a movie rental website or online game application on a website. Upon requesting an account with the third party system 502, the child user 502 may receive a limited account or limited access to the third party system 502, until the child user 503 obtains parental consent to access the system 502. A request can be forwarded 506 from the third party system 502 to the API server 127 at the social networking system 501 to obtain parental authorization for the child user 503. The social networking system 501 determines 507 the validity of the parent user's account, the age of the parent user, and the existence of a parent-child relationship using the methods disclosed above. If the parent user's 504 account, age, and relationship with the child user are verified, the social networking system 501 requests 508 authorization from parent user 504 for the child user 503 to access the third party system 502. The social networking system 501 receives 509 a response from the parent user 504 granting or denying access for the child user 503 to the third party system 502. The social networking system 501 confirms 510 the parent user's 504 response to the third party system 502. The third party system 502 grants or denies 511 access to the child user 503 based on the response received from the parent user 504 via the social networking system 501. Accordingly, the verification methods described above allows the social networking system 501 to act as a clearinghouse to obtain parental consent for children to gain access to various third party systems.

In some embodiments, the request can be received directly from the child user 503 in the social networking system 501. In other embodiments, the request can be sent directly from a third party system 502 to the social networking system 501 based on a child user's 503 request to access the third party system 502. The third party system 502 can be the same system that the child user 503 requests access to, or the third party system 503 can make a request on behalf on another third party system 502. The third party system 502 can also request pre-approval of the child user's 503 account from the parent user 504. This allows the third party system 502 to automatically grant the child user's 503 request without forwarding 506 the request to the social networking system 501.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a request to establish a parent-child relationship for an account in a social networking system of a child user;
   receiving information identifying an account in the social networking system of a purported parent user of the child user;
   determining a first metric indicative of a validity of the purported parent user's account, the first metric determined based on information associated with the purported parent user's account in the social networking system;
   determining a second metric indicative of an existence of a parent-child relationship between the purported parent user and the child user, the second metric determined by comparing a first social data and a second social data in the social networking system wherein the first social data is one or more parent child indicators of the purported parent user's account and the second social data is one or more parent-child indicators of the child user's account;
   determining a confidence level indicative of a likelihood that an actual parent-child relationship exists between the purported parent user and the child user, the confidence level based on the first and second metrics; and
   determining, based at least in part on the determined confidence level, whether to establish the requested parent-child relationship between the child user and the purported parent user.

2. The method of claim 1, further comprising:
   responsive to establishing the parent-child relationship, sending a request for authorization to the purported parent user to allow the child user to access a computing resource.

3. The method of claim 2, further comprising:
   responsive to receiving authorization from the purported parent user, granting the requested access to the child user to the computing resource, wherein the computing resource is the social networking system.

4. The method of claim 2, further comprising:
   responsive to receiving authorization from the purported parent user, granting the requested access to the child user to the computing resource, wherein the computing resource is a third party system.

5. The method of claim 2, responsive to receiving authorization from the purported parent user, granting the requested access to the child user to the computing resource, wherein the computing resource is a website external to the social networking system.

6. The method of claim 1, wherein the first metric is determined based on information about activities or user interactions associated with the purported parent user's account.

7. The method of claim 1, wherein the first metric is determined based on information from a user session about a user location associated with the purported parent user's account.

8. The method of claim 1, wherein the first metric is determined by presenting a challenge to the purported parent user to authenticate the purported parent user's account.

9. The method of claim 8, wherein the challenge requires a response based on information about the purported parent user's connections or interactions in the social networking system.

10. The method of claim 1, wherein the second metric is determined based on activities or user interactions associated with the purported parent user's account.

11. The method of claim 1, wherein the second metric is determined based on common users associated with the purported parent user's account and the child user's account.

12. The method of claim 1, wherein the second metric is determined based on geographical locations associated with the purported parent user and the child user.

13. The method of claim 1, wherein the second metric is determined based on common networks associated with the purported parent user and the child user.

14. The method of claim 1, wherein the second metric is determined based on requesting that the purported parent user and/or the child user declare a parent-child relationship on a profile associated with the account of the purported parent user or the account of the child user.

15. The method of claim 1, further comprising:
determining a third metric indicative of whether the purported parent user is an adult, the third metric determined based on social information associated with the purported parent user's account in the social networking system, and wherein an existence of a parent-child relationship is based on the third metric.

16. The method of claim 15, wherein the third metric is determined based on social information about other users connected with the purported parent user's account.

17. The method of claim 15, wherein the third metric is determined based on activities or user interactions associated with the purported parent user's account.

18. The method of claim 1, wherein the second metric is determined based on the age of the purported parent user and wherein the age of the purported parent user is determined based on information associated with the account of the purported parent user.

19. A method comprising:
receiving a request to establish a parent-child relationship for an account in a social networking system of a child user;
receiving information identifying an account in the social networking system of a purported parent user of the child user;
determining, based on information associated with the purported parent user's account and the child user's account in the social networking system, a confidence level indicative of a likelihood that an actual parent-child relationship exists between the purported parent user and the child user associated with the purported parent user's account the child user's account in the social networking system, the determination made by comparing a first social data and a second social data in the social networking system, wherein the first social data is one or more parent child indicators of the purported parent user's account and the second social data is one or more parent-child indicators of the child user's account; and
determining, based at least in part on the determined confidence level, whether to establish the requested parent-child relationship between the child user and the purported parent user.

20. The method of claim 19, further comprising:
for an established parent-child relationship, requesting the parent user to authorize the child user's access to a third party system;
receiving a response from the parent user to allow or deny access to the child user; and
sending the response to the third party system to grant or deny access to the child user to the third party system.

21. The method of claim 20, wherein the third party system comprises a website or a portion of a website that is external from the social networking system.

22. The method of claim 20, wherein the third party system comprises an online application.

23. The method of claim 20, wherein the third party system comprises a media item.

24. The method of claim 20, wherein the request is sent directly from the child user.

25. The method of claim 20, wherein the request is sent directly from the third party system.

26. The method of claim 19, wherein the confidence level is determined based on information about activities or user interactions associated with the purported parent user's account.

27. The method of claim 19, wherein the confidence level is determined based on social data about common users associated with the purported parent user's account and the child user's account.

28. The method of claim 19, wherein the confidence level is determined based on social information about other users connected with the purported parent user's account.

29. The method of claim 19, wherein the confidence level is determined based on the reported age of the purported parent user.

30. The method of claim 19, wherein the confidence level is determined based on information from a user session about a user location associated with the purported parent user's account.

31. The method of claim 19, wherein the confidence level is determined based on geographical locations associated with the purported parent user and the child user.

32. The method of claim 19, wherein the confidence level is determined based on common networks associated with the purported parent user and the child user.

* * * * *

UNITED STATES PATENT AND TRADEMARK OFFICE
CERTIFICATE OF CORRECTION

| | | |
|---|---|---|
| PATENT NO. | : 8,671,453 B2 | Page 1 of 1 |
| APPLICATION NO. | : 12/858403 | |
| DATED | : March 11, 2014 | |
| INVENTOR(S) | : Underwood et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 146 days.

Signed and Sealed this
Twenty-fifth Day of August, 2015

Michelle K. Lee
*Director of the United States Patent and Trademark Office*